(12) United States Patent
Wilson

(10) Patent No.: US 6,738,701 B2
(45) Date of Patent: May 18, 2004

(54) GEAR SHIFTER TO TRANSMISSION INTERFACE AND CONTROL SUB-SYSTEM

(75) Inventor: Erik C. Wilson, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 09/904,214

(22) Filed: Jul. 12, 2001

(65) Prior Publication Data

US 2002/0007979 A1 Jan. 24, 2002

Related U.S. Application Data

(60) Provisional application No. 60/218,477, filed on Jul. 14, 2000.

(51) Int. Cl.[7] .................................................. G06F 7/00
(52) U.S. Cl. .............................. 701/51; 701/33; 701/36; 701/48; 307/10.1
(58) Field of Search .............................. 701/51, 53, 54, 701/29, 30, 31, 32, 36, 33, 48–50, 114, 115, 102; 74/335, 336 R; 180/292, 312; 307/9.1, 10.1; 340/438, 456

(56) References Cited

U.S. PATENT DOCUMENTS

| | | | |
|---|---|---|---|
| 4,894,781 A | * 1/1990 | Sato et al. | ................... 701/102 |
| 5,369,581 A | * 11/1994 | Ohsuga et al. | ........... 280/5.504 |
| 5,469,356 A | * 11/1995 | Hawkins et al. | ............ 318/591 |
| 6,201,316 B1 | 3/2001 | Knecht | ...................... 307/10.1 |
| 6,272,402 B1 | * 8/2001 | Kelwaski | ..................... 307/9.1 |
| 6,334,081 B1 | * 12/2001 | Robinson et al. | ............. 701/32 |
| 6,359,554 B1 | * 3/2002 | Skibinski et al. | ........... 340/438 |
| 6,665,601 B1 | * 12/2003 | Nielsen | ........................ 701/50 |

* cited by examiner

Primary Examiner—Jacques H. Louis-Jacques
(74) Attorney, Agent, or Firm—Jeffrey P. Calfa; Dennis Kelly Sullivan; Susan L. Lukasik

(57) ABSTRACT

A transmission 16 and gearshift communication sub-system that includes a gearshift 90, a transmission and transmission controller 16, and a common data bus 18. The gearshift 90 communicates with the transmission controller 16 to change gears or mode of operation of the transmission for automatic transmissions over the common data bus. Such communication is by a standard communication protocol that may be the SAE J1939 protocol. Vehicle control system 10 comprises an electrical system controller (ESC) 30, which is the primary component of a vehicle electronic control system. ESC 30 manages a number of vocational controllers disposed on a vehicle 13 and executes a load management program which oversees the total load imposed on the vehicle electrical system and power train by various accessories installed on the vehicle. Most active vehicle components are directly controlled by one of a group of autonomous, vocational controllers, which include a gauge cluster 14, an engine controller 20, a transmission controller 16, an auxiliary instrument and switch bank 12, an antilock brake system (ABS) controller 22, and the gearshift 90 all of which are connected to ESC 30 over the common data bus which may be a serial data bus or link 18.

6 Claims, 5 Drawing Sheets

GEAR SHIFTER TO TRANSMISSION INTERFACE AND CONTROL SUB-SYSTEM

This non-provisional patent application claims priority under Provisional Patent Application Ser. No. 60/218,477, filed Jul. 14, 2000.

BACKGROUND

This invention relates to the communication sub-system for communication between a gear shifter and a smart vehicle transmission. The communication sub-system makes use of existing industry standard or proprietary communication protocols and communication spines replace translation encoders now currently used to facilitate gearshift commands to the electronic control modules of smart transmissions. Smart vehicle transmissions have come into use mostly in commercial applications. Such vehicles appropriate for such installation include light, medium, and heavy duty trucks. This application is related to pending application Ser. No. 09/447,132, filed Nov. 22, 1999 and assigned to inventor's assignee.

PRIOR ART

Smart vehicle transmissions are those with electronic control modules (ECMs) for receiving electronic signals directing gearshift position or mode of operation for automatic transmissions. The operator could operate the transmission or change the mode of the transmission by moving a gearshift in the cab of the vehicle. In contrast to automotive applications where the gearshift is mechanically engaged to operate or change modes of the transmission, the gearshift for a so-called smart transmission was in electronic communication with the transmission ECM through a dedicated line and an electrically inline encoder unit. This is shown in FIG. 5. Each smart transmission made by a different manufacturer requires its own unique shift control (lever or pushbutton control) or a separately programmed encoder unit. The different encoders were separately programmed for the specific transmission. The transmission ECM may additionally have been in communication with an engine ECM through a multiplexed communication network using an industry standard or proprietary protocol.

At a simple level, communication between two agents may be kept physically separated from communications occurring among other agents. Where two or more signals do not use the same physical space, there is no need to separate the signals in time or in carrier wave frequency. Such a communications regime is sometimes termed physical division multiplexing although the term multiplexing is usually reserved to techniques for applying multiple signals to a single medium or physical space. So-called physical division multiplexing describes how motor vehicles have been traditionally wired. The use of separate dedicated wires to connect each switch and lamp is a type of physical division multiplexing. Obviously, physical division multiplexing, while simple in concept, results in the use of many wires (the classical motor vehicle electrical harness), which are difficult to install during manufacturing and problematic to maintain in the field.

Arrangements allowing a number of agents to communicate over a common physical layer or medium offer much greater physical simplicity. Intelligible communication between two or more devices among a greater plurality of devices, all over a common medium, depends upon the communicating devices being able to distinguish, and understand, messages directed to them from other messages which they receive, but which are not intended for them. The process of distinguishing messages depends upon the transmitter of the message applying some attribute to the message which identifies it to the intended recipient. In human conversation, most people readily distinguish speech directed to them from interfering cross-talk in a crowd by the distinctive aspects of the voice of the person addressing them. Where the members of the group are electrical components, the problem still involves identification of a distinguishing attribute of the signal. Appropriate attributes for signals take a number of forms.

A line communicating a signal from a remote switch to a lamp to turn on or off (by having a second switch, local to the lamp, change states to control connection of the lamp between a power bus and ground) cycles only rarely. In a typical trip such a change in state occurs only once or twice, if at all. Where such a line is not intended to provide power to the lamp, and simply indicates changes in state for the local switch controlling the lamp, the line will have the capacity to handle far more data than the occasional indications to turn a lamp on and off. The objective of maintaining simplicity in manufacturing and maintenance are preferably met by allowing communication among a number of components to occur in a single medium, or at least as few communication lines as possible. The line used to connect switch and lamp could interconnect a number of components, carrying messages between any grouping of elements connected to the line when not required to carry an instruction to a lamp to turn on. One way of achieving this objective is a communications regime that divides time into slots during which particular combinations of components have use of a signaling line. Such methods are well known in the art and are examples of time division multiplexing (TDM). In motor vehicles, time division and related multiplexing techniques offer substantial simplification in physical layer required to support the control of vehicle vocations.

Rigid time division multiplexed communications appear to interleave data signals into a single serial signal over a single physical medium. Multiplexed communication systems also provide the reverse function (de-multiplexing) of dividing the single signal into multiple, non-synchronous digital signals. Where demands on the capacity of the data transmission medium are not especially heavy, any unit may be allowed to claim the medium provided collision detection is provided for and other indicia, such as address headers, indicate the signal's destination.

As applied to motor vehicles, multiplexed communications over serial data paths are an effective technique for reducing the number of dedicated communication paths between the numerous switches, sensors, devices and gauges installed on the vehicles. With each increase in the number and variety of accessories and functions installed on each vehicle, the benefits of using a single, multiplexed communication serial link for passing instructions to and receiving information from vehicle devices as diverse as running lights and rear axle temperature sensors becomes greater. Multiplexing the signals to and from local controllers and switches for vehicle systems promises greater physical simplicity through displacing much of the vehicle wiring harness, reducing manufacturing costs, facilitating vehicle electrical load management, and enhancing system reliability.

The specific manner of implementing multiplexed communications is outside the scope of the present invention, which applies a defined protocol, the SAE J1939 protocol. Additionally, proprietary protocols may be used although over a network similar to as described here. The development by the Society of Automotive Engineers of the J1939 series of standards for multiplexed communications testifies to the progress in the application of multiplexed communications to vehicles. Standards have been or are being developed relating the communication path, transmission collision detection, diagnostic ports and data protocols, among other topics. The J1939 protocol provides an open protocol and definition of the performance requirements of the medium of the physical layer, but also allows for development of proprietary protocols. The SAE J1939 protocol is a specialized application of a controlled area network (CAN) and may be readily implemented utilizing commercial integrated circuits such as the C167 Integrated Circuit from Siemens of Germany.

A serial communications system utilizing a multiplexing regime can link several remote digital controllers positioned around a vehicle with an electrical system controller (ESC) for two way communication. Remote digital controllers are addressable, allowing them to respond to signals intended for them initialize particular functions. As described above the transmission ECM may be a remote digital controller. They may also include programming that allows the device to react to local conditions as well as condition indicating signals provided the controller. The ESC may pass requests and instructions received for operations of certain devices, addressed to the correct remote controller, in a fashion to condition the timing and duration of the responses to requests to better manage overall vehicle electrical load.

What is needed and does not exist in the prior art is a transmission and gearshift subsystem or a vehicle which such a system that does not require a separate encoder and separate dedicated communication line dedicated to electrical signals between a gearshift and a smart electronic transmission controller.

SUMMARY

An object of the invention is to provide a transmission and gearshift subsystem for a mobile vehicle that does not require a separate encoder in series between the gearshift and the electronic transmission. This should at a minimum save on the cost of having the encoder. A second object of the invention is to provide for communications between the gearshift and the electronic transmission without the need for a dedicated electrical communication line. A third object of the invention is provide an embodiment of a communication sub-system for communications between the gearshift and the electronic transmission that uses an industry standard protocol rather than proprietary commands limited to the specific transmission manufacturer.

The transmission and gearshift communication sub-system and vehicle with the subsystem installed of this invention satisfies all the objects of the invention and others not mentioned. Rather than have a separate dedicated line between the electronic gearshift and the electronic transmission, the communication subsystem of this invention involves electrically connecting both the gearshift and the transmission ECM to a common vehicle network. The network may allow communication by an industry standard, such as J1939, or by a proprietary protocol. The key point is that the gearshift and transmission ECM are both tied into a common network to communicate using a standard protocol. There may be other digital controllers engaged to the network for communication. The transmission ECM will receive electronic messages for manual transmission control or transmission mode change (i.e. Park, Reverse, Neutral, Economy, Hold) in signals according to the standard protocol through the common network from the gearshift upon operator manipulation of the gearshift. No special dedicated line between the gearshift and the transmission will be required. Additionally, there will be no encoder module to translate instructions from the gearshift because the gearshift will communicate via a standard protocol to the transmission ECM. It should be noted that transmission ECMs already communicate with vehicle engine ECMs using such standard protocols as J1939 so receiving instructions from the gearshift will be a minor programming effort. A drawing of a sample vehicle electronic communication sub-system for communication between a gearshift and an electronic transmission is shown. Additionally, such a sub-system as part of a vehicle wide network is also shown in a second figure.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
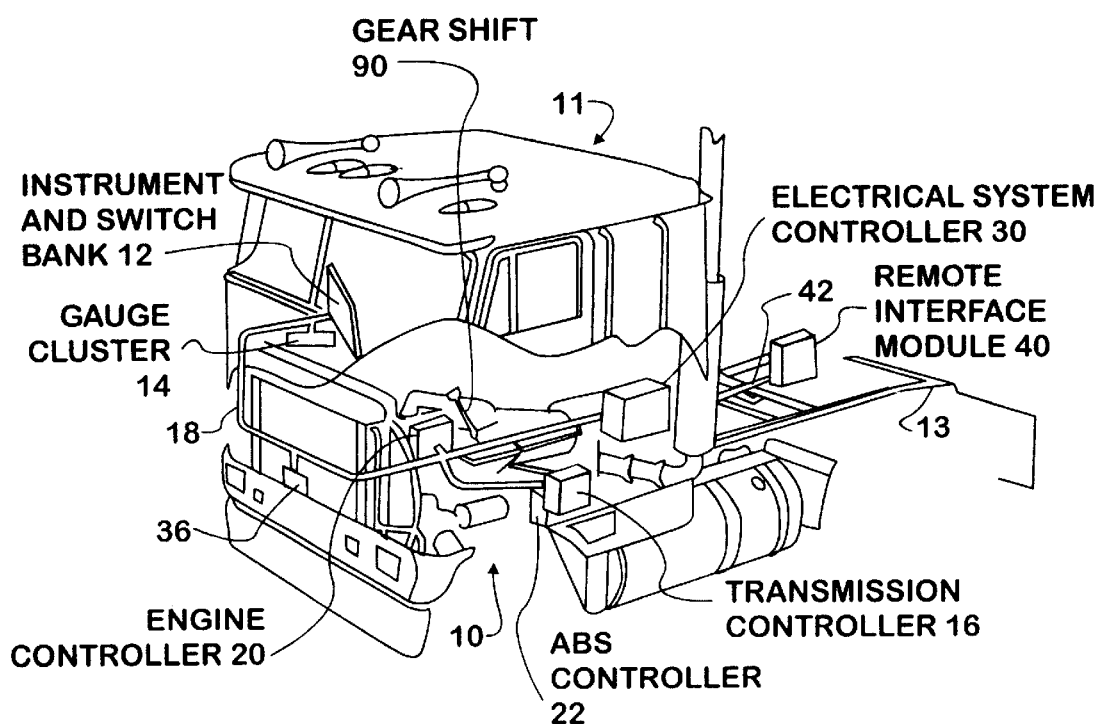
FIG. 1 is a perspective view of a vehicle electrical system.
Figure 6:
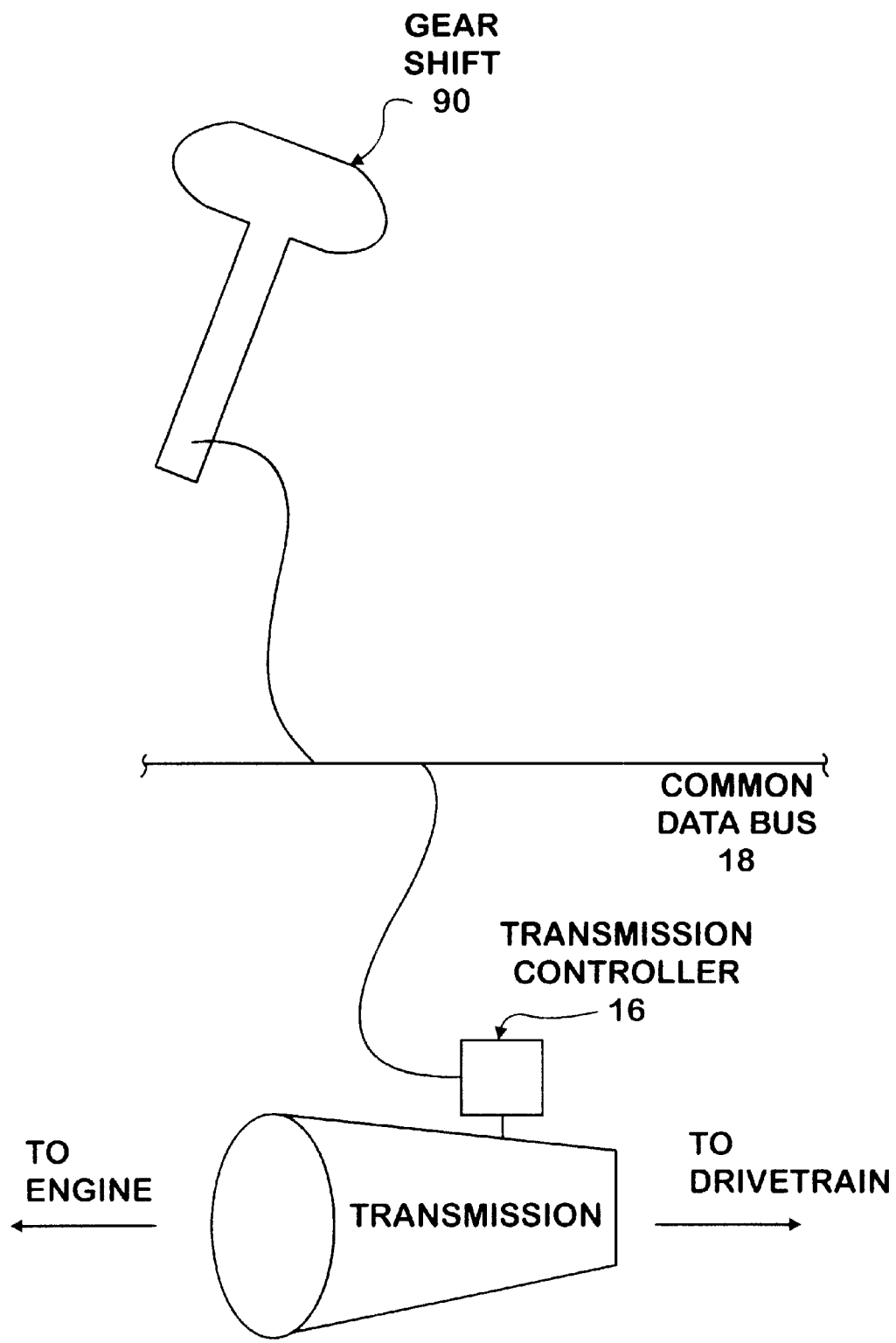
FIG. 6 is a basic form diagram of the invention.

The gear shifter to transmission interface and control sub-system in is its most basic form includes a gearshift 90, a transmission and transmission controller 16, and a common data bus 18. The gearshift 90 communicates with the transmission controller 16 to change gears or mode of operation of the transmission for automatic transmissions over the common data bus 18. Such communication is by a standard communication protocol that may be the SAE J1939 protocol. This basic embodiment is shown in FIG. 6. For an additional embodiment, FIG. 1 is a perspective view of a vehicle electrical system 10 installed on a vehicle 13. Vehicle control system 10 comprises an electrical system controller (ESC) 30, which is the primary component of a vehicle electronic control system. ESC 30 manages a number of vocational controllers disposed on vehicle 13 and executes a load management program which oversees the total load imposed on the vehicle electrical system and power train by various accessories installed on the vehicle. Most active vehicle components are directly controlled by one of a group of autonomous, vocational controllers, which include a gauge cluster 14, an engine controller 20, a transmission controller 16, an auxiliary instrument and switch bank 12, an antilock brake system (ABS) controller 22, and the gearshift 90 all of which are connected to ESC 30 over the common data bus which may be a serial data bus or link 18. The autonomous controllers include local data processing and programming and are typically supplied by the manufacturer of the controlled component. Serial data link 18 may be a twisted pair cable constructed in accordance with SAE standard J1939 and is externally accessible via a diagnostic port 36. Although the autonomous controllers handle many functions locally and are functionally difficult without reference to ESC 30, they report data to ESC 30 and can receive operational requests from ESC 30. The alternative common data bus 18 may operate using proprietary communication protocol other than an industry standard.

The engine controlled by the engine controller 20 of the vehicle 13 is engaged to a chassis of the vehicle 13 shown in FIG. 1. The transmission of the vehicle 13, controlled by the transmission controller 16, is also engaged to the chassis of the vehicle 13.

A second serial data link 42 extends from ESC 30 back to remote interface module 40 Remote interface module 40, similarly to the autonomous controllers, provides local control signals to electrical devices constituting or controlling loads installed on vehicle 13. While remote interface module 40 has data processing capability, it typically includes minimal local programming and is dependent on and functionally specified by signals received over the second serial data link 42 from ESC 30 for operation. Hence RIMs 40 are herein termed dependent controllers.

The loads imposed on vehicle 13 systems controlled by electrical control system 30 are usually electrical loads, however, they may include electronically controlled engagement of mechanical devices to the power train of vehicle 13. Gear selection in an automatic transmission would be an example of such an arrangement. Other electrically controlled non-electrical loads can include control of a clutch for an air conditioning compressor, or actuation of pumps driven by the vehicle drive train. The load management program can, depending on power demands by components, including accessories controlled by a RIM 40, request increased power output from the engine through engine controller 20.

Gauge cluster 14, transmission controller 16 and engine controller 20 all communicate with electronic system controller 30, which also monitors inputs received from the auxiliary instrument and switch bank 12, over the serial communication link in harness 18. Electronic system controller 30 may be programmed to override the normal response characteristics of the gauge cluster 14, transmission controller 16 and engine controller 20, should electrical and mechanical loads exceed the capacity of the vehicle, should requests conflict with one another, and under other circumstances.

A RIM 40 is a general purpose control interface allowing the attachment of various accessories to vehicle 13. RIM 40 provides a plurality of ports providing for each of the following: analog inputs; analog outputs; digital inputs; and digital outputs. Characterization of a particular port as, for example, an output port, does not necessarily mean that it functions exclusively as an output port. For example, an output port may include voltage drop sensing elements, current flow sensing elements, or both, allowing determination by ESC 30 of whether, for example, a bulb in a lamp connected to the output port is operative, or whether a short circuit condition exists in an attached device.

Figure 2:
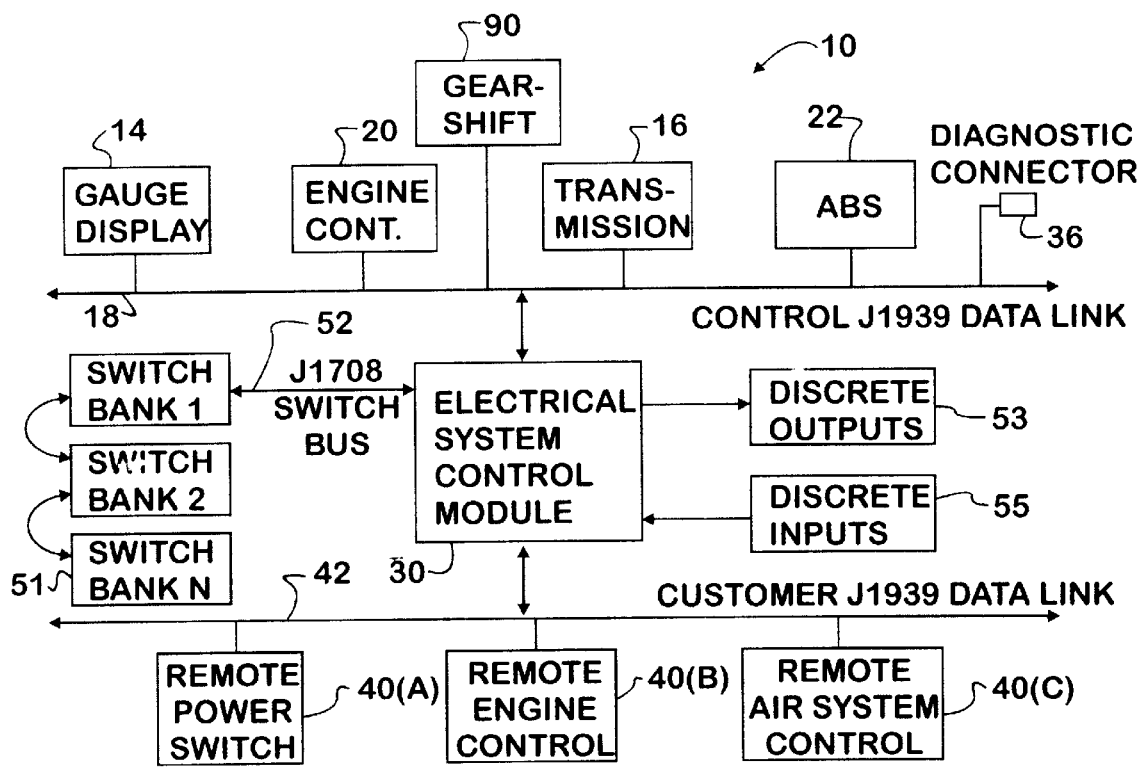
FIG. 2 is a high level block diagram of the control network for a vehicle.

FIG. 2 is a schematic illustration of the vehicle control system 10. Electrical system controller 30 communicates with local vocational controllers over one of two major SAE J1939 serial data links 18 and 42. The J1939 standard provides for both a open protocol and a proprietary protocol, which differ in the formatting of information transmitted over the serial data links, Accordingly, serial data links 18 and 42 may use the same or different communication protocols. Controllers for substantially common vehicle components such as transmissions, engines and the like communicate with ESC 30 over serial data link 18, which utilizes a open protocol. A diagnostic connector 36 taps into serial data link 18 over which portions of the programming of ESC 30 may be overwritten. In the illustrated embodiment three remote interface modules are defined by ESC 30 over serial data link 42 to function as a remote power switch 40(A), a remote engine controller 40(B) and a remote air control system 40(C). The specific functions of the several remote interface modules are unimportant and are given as examples only. Disposition of the control of major vehicle drive train components, the vehicle gauge cluster and the diagnostic port 36 onto serial data link 18, and the provision of a second serial data link 42 for carrying communication among the definable, dependent controllers (remote interface modules 40) segregates major vehicle elements in a protected partition via link 18 which is isolated from operator defined functionality implemented over serial data link 42.

ESC 30 also provided from monitoring several bi-state switches in a group of switch banks 51 over a relatively low baud rate SAE J1708 data link 52. ESC 30 can also be directly connected to several devices and sensors directly, which are grouped as discrete outputs 53 and discrete inputs 55.

Figure 3:
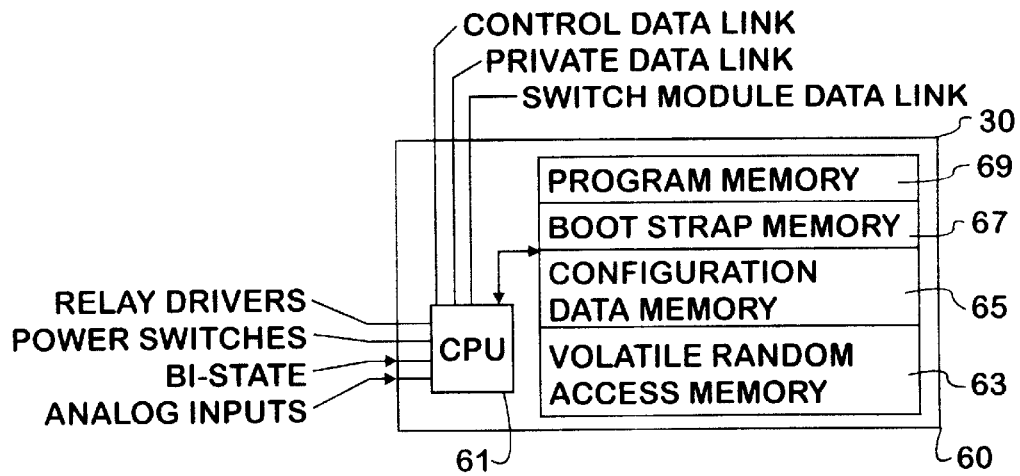
FIG. 3 is a diagrammatic depiction of the disposition of data interfaces for the central electrical system controller of the invention.

FIG. 3 is a block diagram of the various elements of ESC 30. ESC 30 includes a fixed number of interface connections for reading bi-state (i.e. on/off) switches. These inputs are appropriate for reading warning light sensors that typically provide a vehicle ground connection to indicate that the sensor is in an active state. An open circuit connection is provided by the sensor to indicate an inactive state. Another collection of inputs labeled analog inputs. These inputs are subject to sampling, analog to digital conversion and storage as a representative binary value in volatile random access memory section 63 of memory 60 for further processing.

Figure 4:
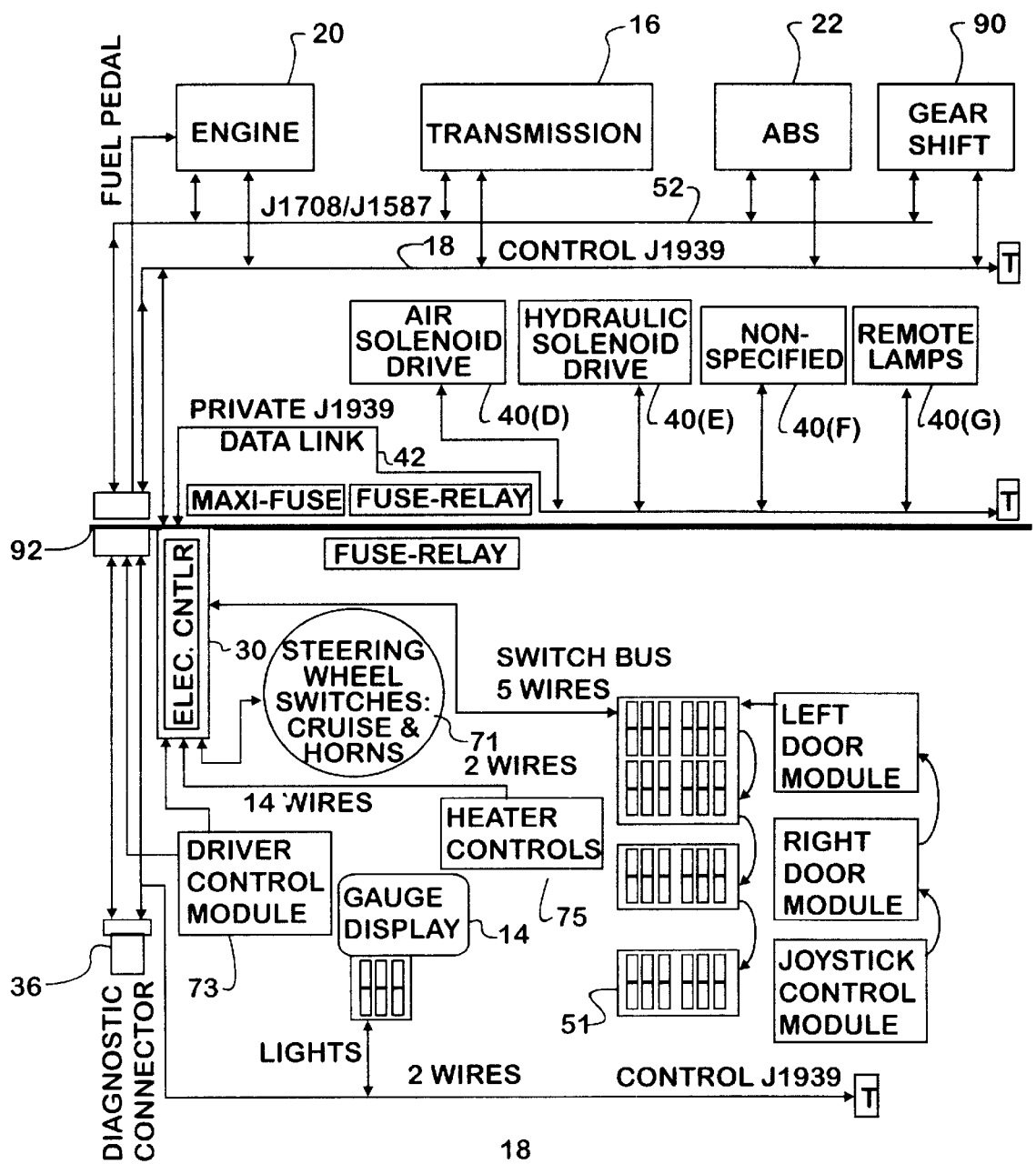
FIG. 4 is a detailed block diagram of the control network of the present invention.
Figure 5:
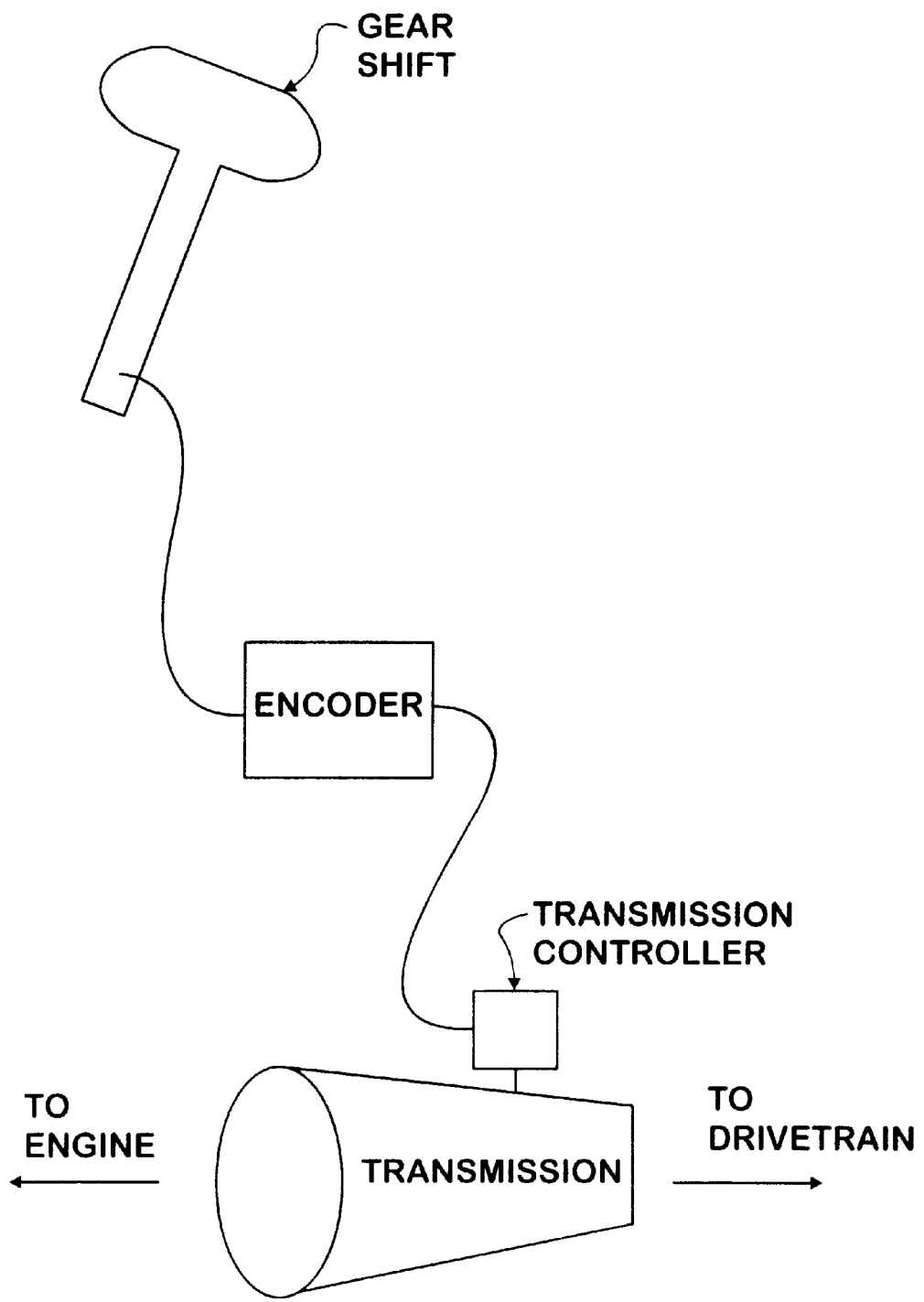
FIG. 5 is basic form diagram of a prior art gearshift to transmission communication subsystem.

FIG. 4 is a detailed schematic illustration of a physical layer for the invention. ESC 30, located on the cabin side of firewall 92, communicates with engine controller 20, transmission controller 16 and anti-lock brake system 22, gauge display 14, and the gearshift 90 primarily over serial data link 18. Selected bi-state switches in engine controller 20, transmission controller 16 and ABS 22 may be controlled or monitored over serial data link 52. Serial data link 42 provides communication between four dependent controllers or remote interface modules, on which ESC 30 implements an air solenoid drive 40(D), a hydraulic solenoid drive 40(E), a non-specified controller 40(F) and a controller for remote lamps 40(G). ESC 30 is directly connected to heater controls 75, steering wheel switches 71, and a driver control module 73 handling a plurality of other switches. The direct interfaces implemented by ESC 30 are also functionally defined by configuration programming.

FIG. 6 shows the communication between the gear shift 90 and the transmission controller 16 through the common data bus 18 without the other components also communicating along the common data bus 18.

As described above, the transmission 16 and gearshift communication sub-system 18 and vehicle 13 with the subsystem installed provide a number of advantages, some of which have been described above and others of which are inherent in the invention. Also modifications may be proposed to the transmission 16 and gearshift communication sub-system 18 and vehicle 13 with the subsystem installed without departing from the teachings herein.

I claim:

1. A gear shifter to transmission interface and control sub-system for a mobile vehicle, the vehicle having a chassis and an operators cab, the vehicle having a transmission engaged to a chassis of the vehicle for driving an axle, the transmission engaged to an engine of the vehicle, and the engine also engaged to the chassis of the vehicle, comprising:

a vehicle electrical system with a common data bus;
   an electrical system controller electrically engaged to communicate on said common data bus;
   an engine controller engaged to the engine to control engine operation;
   said engine controller electrically engaged to said common data bus to communicate along said common data bus;
   a transmission controller engaged to the transmission to control transmission operation;
   said transmission controller electrically engaged to said common data bus to communicate along said common data bus;
   a gear shift, located within the cab; and
   said gear shift electrically directly engaged to said common data bus to communicate changes of gears or mode to said transmission controller along said common data bus.

2. The gear shifter to transmission interface and control sub-system of claim 1, wherein:

said gear shift to transmission controller communications along sad common data bus is through an standard communications protocol.

3. The gear shifter to transmission interface and control sub-system of claim 2, wherein:

said standard communications protocol is SAE J1939.

4. A mobile vehicle in combination with a gear shifter to transmission interface and control sub-system, comprising:

a chassis;
   an operators cab engaged to said chassis;
   a transmission engaged to said chassis for driving an axle;
   said transmission engaged to an engine;
   said engine engaged to said chassis;
   a vehicle electrical system with a common data bus;
   an electrical system controller electrically engaged to communicate on said common data bus;
   an engine controller engaged to the engine to control engine operation;
   said engine controller electrically engaged to said common data bus to communicate along said common data bus;
   a transmission controller engaged to the transmission to control transmission operation;
   said transmission controller electrically engaged to said common data bus to communicate along said common data bus;
   a gear shift, located within the cab;
   said gear shift directly electrically engaged to said common data bus to communicate changes of gears or mode to said transmission controller along said common data bus through an standard communications protocol.

5. The vehicle of claim 4, wherein:
   said standard communications protocol is SAE J1939.

6. A mobile vehicle, comprising:

a chassis;
   a transmission engaged to said chassis for driving an axle;
   said transmission engaged to an engine;
   said engine engaged to said chassis;
   a vehicle electrical system with a common data bus;
   said common data bus a twisted pair cable constructed in accordance with SAE J1939;
   an electrical system controller electrically engaged to communicate on said common data bus;
   said electrical system controller managing vocational controllers electrically engaged to said common data bus;
   said vocational controllers including a gauge cluster, an engine controller, a transmission controller, an auxiliary instrument and switch bank, an anti-lock brake system controller and a gearshift; and
   said gear shift directly electrically engaged to said common data bus to communicate changes of gears or mode to said transmission controller along said common data bus.

* * * * *